(12) United States Patent
Kobashikawa (10) Patent No.: US 11,869,042 B2
(45) Date of Patent: Jan. 9, 2024

(54) BIDDING ASSISTANCE DEVICE, BIDDING ASSISTANCE METHOD, AND COMPUTER-READABLE MEDIUM STORING BIDDING ASSISTANCE PROGRAM

(71) Applicant: RAKUTEN GROUP, INC., Tokyo (JP)

(72) Inventor: Carlos Kobashikawa, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 1 day.

(21) Appl. No.: 17/895,288

(22) Filed: Aug. 25, 2022

(65) Prior Publication Data

US 2023/0177567 A1 Jun. 8, 2023

(30) Foreign Application Priority Data

Sep. 21, 2021 (JP) ................................. 2021-153520

(51) Int. Cl.
*G06Q 30/02* (2023.01)
*G06Q 30/0273* (2023.01)
*G06Q 30/0201* (2023.01)

(52) U.S. Cl.
CPC ..... *G06Q 30/0275* (2013.01); *G06Q 30/0206* (2013.01)

(58) Field of Classification Search
CPC ........................ G06Q 30/0275; G06Q 30/0206
See application file for complete search history.

(56) References Cited

U.S. PATENT DOCUMENTS 10,915,929 B1 * 2/2021 Huang ............... H04N 21/4758
2010/0138291 A1 * 6/2010 Silverman .......... G06Q 30/0275
705/14.46

(Continued)

FOREIGN PATENT DOCUMENTS

JP 2008-102174 A 5/2008

OTHER PUBLICATIONS

"How to Combine 'Adjust Bids By Placement' And Your Keyword Bid" (by "the Badger" published on Mar. 18, 2020 at https://www.adbadger.com/blog/placement-bid-adjustment-with-keyword-bid-campaign-settings-amazon-ppc/) (Year: 2020).*

*Primary Examiner* — James M Detweiler
(74) *Attorney, Agent, or Firm* — Sughrue Mion, PLLC (57) ABSTRACT

A bidding assistance device includes a ratio calculation unit configured to calculate a ratio of an actual advertising cost index to a goal advertising cost index, the actual advertising cost index being based on an advertising delivery performance at a bidding time in an advertising period, the goal advertising cost index being requested by an advertiser in the advertising period, an adjustment factor calculation unit configured to calculate an adjustment factor from the ratio and from a relationship between the advertising period and the bidding time, the adjustment factor being used to adjust a bid price of an advertisement, and a determination unit configured to determine the bid price at the bidding time using the adjustment factor calculated by the adjustment factor calculation unit, the goal advertising cost index, and a forecast effectiveness index forecast from advertising effectiveness, the advertising effectiveness being obtained from the advertising delivery performance.

5 Claims, 3 Drawing Sheets

(56) References Cited

U.S. PATENT DOCUMENTS

2013/0124308 A1\* 5/2013 Hegeman ............... G06Q 10/04
                                                    705/14.48
2016/0275571 A1\* 9/2016 Deng ................. G06Q 30/0275
2017/0308933 A1\* 10/2017 Bhalgat .............. G06Q 30/0257

\* cited by examiner

BIDDING ASSISTANCE DEVICE, BIDDING ASSISTANCE METHOD, AND COMPUTER-READABLE MEDIUM STORING BIDDING ASSISTANCE PROGRAM

BACKGROUND

1. Field

The present disclosure relates to a bidding assistance device, a bidding assistance method, and a computer-readable medium storing bidding assistance program.

2. Description of Related Art

Japanese Laid-Open Patent Publication No. 2008-102174 discloses an advertisement delivering method in the field of web advertising. Such advertising includes contextual advertising and search advertising. In contextual advertising, advertisements which are relevant to a webpage or the like are displayed. In search advertising, an advertiser's advertisement is a displayed on the page of a search result that is obtained when a phrase specified by the advertiser is input as a query.

Contextual advertisements, search advertisements, and the like may be provided programmatically. In such a case, real-time bidding (RTB), by which bidding is performed when an advertising space is displayed on a medium, may be used so that some of the advertisements of multiple advertisers that have been matched (i.e., sold) are exposed on the advertising medium such as a webpage subject to bidding by the advertisers. One of the methods for determining a bid price (e.g., cost per thousand impressions, or cost per mille (CPM)) of an advertisement in RTB is to forecast advertising effectiveness in the future from actual advertising effectiveness (e.g., click-through rate (CTR) and conversion rate (CVR)) of an advertisement that has been exposed so far, and determine a bid price that allows the advertising cost to reach a goal cost per click (CPC) or a goal cost per action (CPA). However, when the forecast accuracy is low, determining a bid price that allows the advertising cost to reach a goal cost is difficult.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A bidding assistance device according to an aspect of the present disclosure includes a ratio calculation unit configured to calculate a ratio of an actual advertising cost index to a goal advertising cost index, the actual advertising cost index being based on an advertising delivery performance at a bidding time in an advertising period, the goal advertising cost index being requested by an advertiser in the advertising period, an adjustment factor calculation unit configured to calculate an adjustment factor from the ratio and from a relationship between the advertising period and the bidding time, the adjustment factor being used to adjust a bid price of an advertisement, and a determination unit configured to determine the bid price at the bidding time using the adjustment factor that has been calculated by the adjustment factor calculation unit, the goal advertising cost index, and a forecast effectiveness index that has been forecast from advertising effectiveness, the advertising effectiveness being obtained from the advertising delivery performance.

A bidding assistance method according to another aspect of the present disclosure includes calculating, by a computer, a ratio of an actual advertising cost index to a goal advertising cost index, the actual advertising cost index being based on an advertising delivery performance at a bidding time in an advertising period, the goal advertising cost index being requested by an advertiser in the advertising period, calculating, by the computer, an adjustment factor from the ratio and from a relationship between the advertising period and the bidding time, the adjustment factor being used to adjust a bid price of an advertisement, and determining, by the computer, the bid price at the bidding time using the calculated adjustment factor, the goal advertising cost index, and a forecast effectiveness index that has been forecast from advertising effectiveness, the advertising effectiveness being obtained from the advertising delivery performance.

A computer-readable medium according to a further aspect of the present disclosure stores a program for causing a computer to calculate a ratio of an actual advertising cost index to a goal advertising cost index, the actual advertising cost index being based on an advertising delivery performance at a bidding time in an advertising period, the goal advertising cost index being requested by an advertiser in the advertising period, calculate an adjustment factor from the ratio and from a relationship between the advertising period and the bidding time, the adjustment factor being used to adjust a bid price of an advertisement, and determine the bid price at the bidding time using the calculated adjustment factor, the goal advertising cost index, and a forecast effectiveness index that has been forecast from advertising effectiveness, the advertising effectiveness being obtained from the advertising delivery performance.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A bidding assistance device 10, a bidding assistance method, and a computer-readable medium storing bidding assistance program according to an embodiment will now be described with reference to the drawings.

Embodiment

Bidding Assistance Device 10

For example, the bidding assistance device 10 determines the bid price (e.g., cost per mille (CPM)) of an advertisement in real-time bidding (RTB), by which bidding is performed when an advertising space is displayed on a medium, so that some of the advertisements of advertisers that have been matched (i.e., sold) are exposed on the advertising medium such as a webpage subject to bidding by the advertisers. The bidding assistance device 10 may provide one of the functions of a demand-side platform (DSP). The DSP can control, for example, a click-through rate (CTR), a conversion rate (CVR), the determination of a bid price, and a budget consumption pace by delivering an advertisement intended for an audience that contributes to clicks and conversion. Advertisements exposed on a webpage, which is a medium provided to a user through the web, may be displayed in a native application. Examples of advertisements exposed on a webpage include contextual advertisements displayed on a webpage related to an item or service provided by an advertiser, and search advertisements displayed on the page of a search result obtained when a phrase specified by an advertiser is input as a query. For example, an advertiser presets information including a period during which the advertiser wants to show an advertisement and including the advertising budget, between the advertiser and the bidding assistance device 10 (or its managing agent). Within the budget and the period, the advertisement of the advertiser is managed. In the advertising management, the advertiser receives a result report about the effectiveness of the advertisement of the advertiser that has been bid by the bidding assistance device 10 and exposed on each medium.

Figure 1:
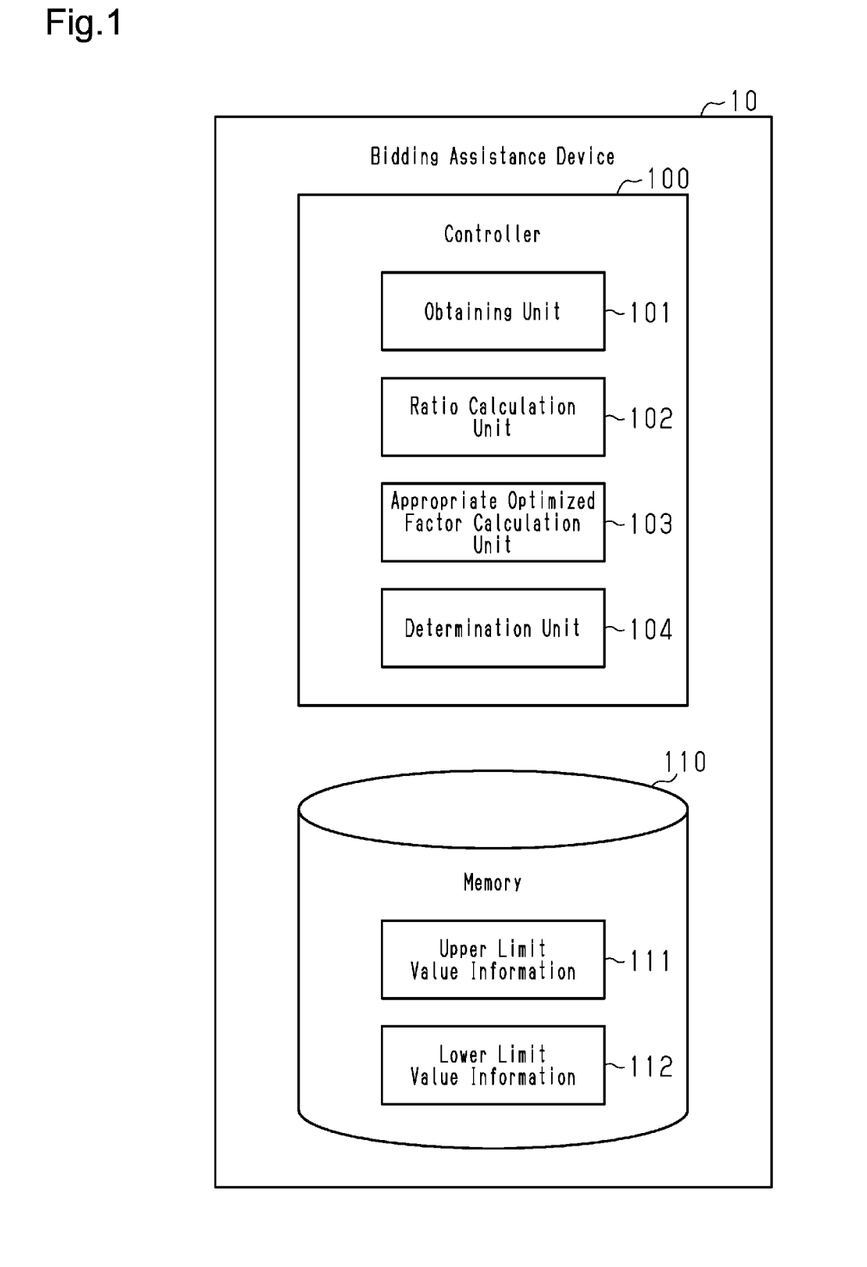
FIG. 1 is a diagram showing an example of the configuration of a bidding assistance device.

As shown in FIG. 1, the bidding assistance device 10 of the present embodiment includes a controller 100 and a memory 110. The controller 100 functions when, for example, a hardware processor such as a central processing unit (CPU) executes a program (software). Some of or all of these components may be provided by hardware (including circuitry) such as a large scale integration (LSI), an application specific integrated circuit (ASIC), a field-programmable gate array (FPGA), or a graphics processing unit (GPU), or may be provided through cooperation of software and hardware.

The memory 110 includes a non-transitory memory medium such as a random access memory (RAM), a hard disk drive (HDD), a flash memory, or a read-only memory (ROM). In addition to the program that is executed on the controller 100, the memory 110 stores upper limit value information 111 and lower limit value information 112. The upper limit value information 111 and the lower limit value information 112 will be described in detail later.

The controller 100 includes an obtaining unit 101, a ratio calculation unit 102, an appropriate optimized factor (adjustment factor) calculation unit 103, and a determination unit 104.

Process of Bidding Assistance Device 10

Figure 2:
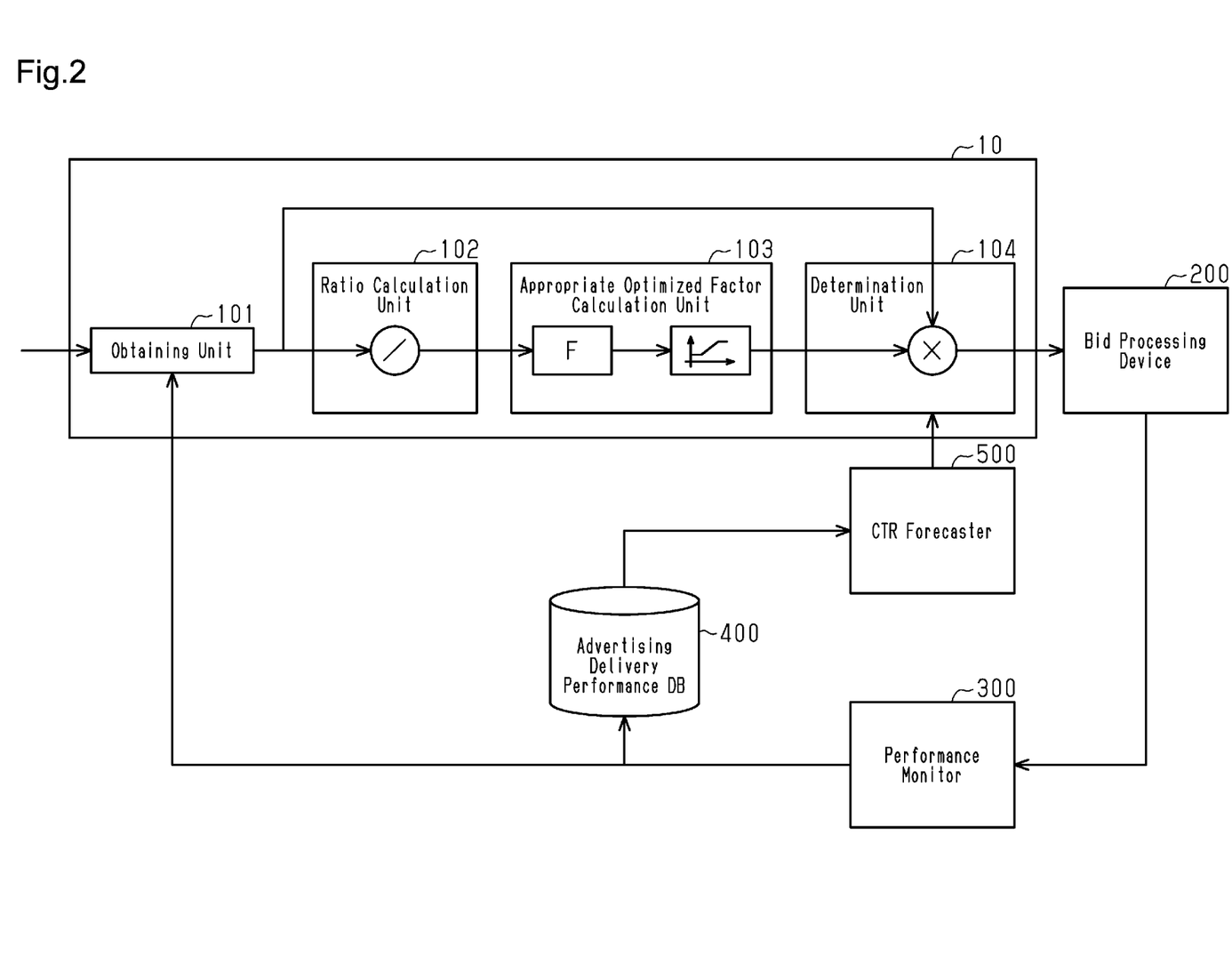
FIG. 2 is a diagram schematically showing the process of the bidding assistance device.

The process of the bidding assistance device 10 will now be described with reference to FIG. 2. The process of the bidding assistance device 10 relates to the processes of a bid processing device 200, a performance monitor 300 (advertising delivery performance obtaining device), an advertising delivery performance DB 400, and a CTR forecaster 500 (advertising effectiveness CTR forecaster). The bid processing device 200, the performance monitor 300, and the CTR forecaster 500 are, for example, separate from the bidding assistance device 10 and are connected to the bidding assistance device 10 in a communicable manner. The advertising delivery performance DB 400 is connected to at least the bid processing device 200 and the performance monitor 300 in a communicable manner. The advertising delivery performance DB 400 stores information indicating advertising delivery performance and information indicating the advertising effectiveness obtained from the advertising delivery performance. The advertising delivery performance and advertising effectiveness will be described in detail later.

Using the bid prices of advertisers, the bid processing device 200 executes a bidding process that exposes an advertisement on a webpage. For example, the bid processing device 200 sets, as a successful bidder who exposes an advertisement on a webpage, an advertiser who placed a bid at the maximum one of the bid prices of advertisers.

The performance monitor 300 obtains, for example, as advertising delivery performance, various types of information related to the processing result of the bid processing device 200. Examples of the advertising delivery performance include information indicating whether a successful bid was made to expose an advertisement on a webpage and information indicating the bid price of an advertisement. The performance monitor 300 obtains the advertising delivery performance in a consecutive manner or at a predetermined time interval. The performance monitor 300 causes the advertising delivery performance DB 400 to store information indicating the obtained advertising delivery performance.

Further, the performance monitor 300 calculates an actual cost per click (aCPC) (actual advertising cost index) from the history of the obtained advertising delivery performance. More specifically, the performance monitor 300 calculates, as the aCPC, a value obtained by dividing, by the number of times an advertisement displayed on a webpage has been clicked, the advertising cost that has been paid so far in an advertising period (also referred to as an ad campaign period or a campaign period). The advertising period (the ad campaign period or the campaign period) refers to a period during which an advertiser exposes an advertisement. As described above, the advertising delivery performance DB 400 stores, as advertising delivery performance, information indicating the bid price of an advertisement. The performance monitor 300 calculates, for example, as the advertising cost that has been paid so far in the advertising period, a cumulative value of bid prices stored in the advertising delivery performance DB 400. Then, the performance monitor 300 calculates, as the aCPC, a value obtained by dividing the calculated advertising cost by the number of successful bids to expose an advertisement on a webpage. The performance monitor 300 outputs the calculated aCPC to the obtaining unit 101.

Using the obtained advertising delivery performance, the performance monitor 300 calculates the advertising effectiveness obtained from the advertising delivery performance. In the present embodiment, the performance monitor 300 calculates, as advertising effectiveness, an actual CTR that is based on the advertising delivery performance. More specifically, the performance monitor 300 calculates the actual CTR using the number of times an advertisement has been displayed on a webpage and the number of times that advertisement has been clicked. For example, the performance monitor 300 obtains from the bid processing device 200, as advertising delivery performance, information indicating the number of times an advertisement has been displayed on a webpage and the number of times that advertisement has been clicked. The performance monitor 300 causes the advertising delivery performance DB 400 to store the calculated actual CTR.

The CTR forecaster 500 forecasts a future CTR from the history of the advertising effectiveness stored in the advertising delivery performance DB 400. The future CTR is hereinafter referred to as the forecast CTR (fCTR). For example, the CTR forecaster 500 outputs, to the determination unit 104, the fCTR that has been forecast using the following method.

Methods for determining the fCTR include a method for, in a specific medium where the advertiser wants to post an advertisement, using creatives having similar content for audiences which have similar attributes and using the CTR of an advertisement that was previously delivered. In other words, methods for determining the fCTR include a method for referring to the delivery performance of similar advertising content for similar advertising spaces. In this determination method, for example, the average of values obtained through this method in the advertising period can be used as the fCTR. Alternatively, the CTR forecaster 500 may output a forecast estimation index as an objective variable by executing multiple regression analysis in which the variable related to the advertising space and advertising content is an explanatory variable.

The CTR forecaster 500 may use a given initial value for the forecast estimation index at the start of the advertising period. Further, the CTR forecaster 500 can output the fCTR using a learning model which has learned the actual CTR and of which the characteristic amounts are various values related to the delivery performance of the above-described advertising space and advertising content. The various values related to the delivery performance include a CTR, cost per click (CPC), CVR, cost per action (CPA), click through (CT), conversion (CV), impression (IMP), and cost spent for advertising delivery. Furthermore, the CTR forecaster 500 can output the forecast estimation index by, for example, analyzing the above-described explanatory variable in addition to the bidding time of bidding for an advertisement in the advertising period. Additionally, the CTR forecaster 500 can forecast the fCTR using a learning model that has learned, as training data, the history of the above-described actual CTR, the bidding time (a bidding time point) of bidding for an advertisement, and the fCTR. The CTR forecaster 500 outputs the forecast fCTR to the determination unit 104.

In the case of using an analysis or model in which the above-described bidding time of bidding for an advertisement in the advertising period is not taken into account, or in a case where the analysis data or learning data is insufficient even if the bidding time of bidding for an advertisement in the advertising period is taken into account, the CTR forecaster 500 may have a low reliability of forecasting the future CTR. In contrast, even when having a low reliability of forecasting the future CTR, the CTR forecaster 500 forecasts the future CTR and outputs it to the determination unit 104 as the fCTR. The CTR forecaster 500 forecasts the future CTR and outputs it to the determination unit 104 as the fCTR even if, for example, the number of advertising exposures is low and the data related to click and conversion of the advertisement is insufficient. Alternatively, the CTR forecaster 500 forecasts the future CTR and outputs it to the determination unit 104 as the fCTR even if variations occur in the number of advertising exposures and the CTR in the same advertising period.

The obtaining unit 101 obtains, for example, information indicating a goal cost per click (gCPC) (goal advertising cost index). The gCPC indicates, for example, the CPC of an advertisement requested by an advertiser in an advertising period. At the end of the advertising period, the advertiser bids for an advertisement for the CPC to reach the gCPC.

At the bidding time point (bidding time) of bidding for an advertisement, the obtaining unit 101 obtains, from the performance monitor 300, information indicating advertising delivery performance that is based on the advertising delivery performance of the advertisement that has been displayed on a webpage. The aCPC indicates the CPC of an advertisement that has been exposed on a webpage in an advertising period. The obtaining unit 101 obtains information indicating the latest aCPC from the performance monitor 300.

The ratio calculation unit 102 calculates the ratio of the aCPC to the gCPC. The ratio calculation unit 102 calculates, for example, as an advertising cost ratio, a value obtained by dividing the aCPC by the gCPC that has been obtained by the obtaining unit 101.

The appropriate optimized factor calculation unit 103 calculates an appropriate optimized factor F (adjustment factor) from the advertising cost ratio and from the relationship between the advertising period and bidding time. The appropriate optimized factor is used to adjust the bid price of an advertisement. First, the appropriate optimized factor calculation unit 103 calculates the remaining period factor (hereinafter referred to as period factor) from the relationship between the advertising period and the bidding time. The period factor will be described in detail later. The appropriate optimized factor calculation unit 103 calculates the appropriate optimized factor from the calculated period factor and the advertising cost ratio that has been calculated by the ratio calculation unit 102.

The determination unit 104 determines the bid price using the appropriate optimized factor, gCPC, and fCTR. In the following description, the bid price is denoted by cost per thousand impressions or cost per mille (CPM). CPM is, for example, the advertising cost per one thousand impressions of an advertisement. Generally, CPM is a product of CTR and CPC or a product of a CVR and CPA. In the following description, the determination unit 104 determines, as the bid price (CPM), a product of fCTR and gCPC.

The process of each unit will now be described in detail.

Detail of Appropriate Optimized Factor Calculation Unit 103

Figure 3:
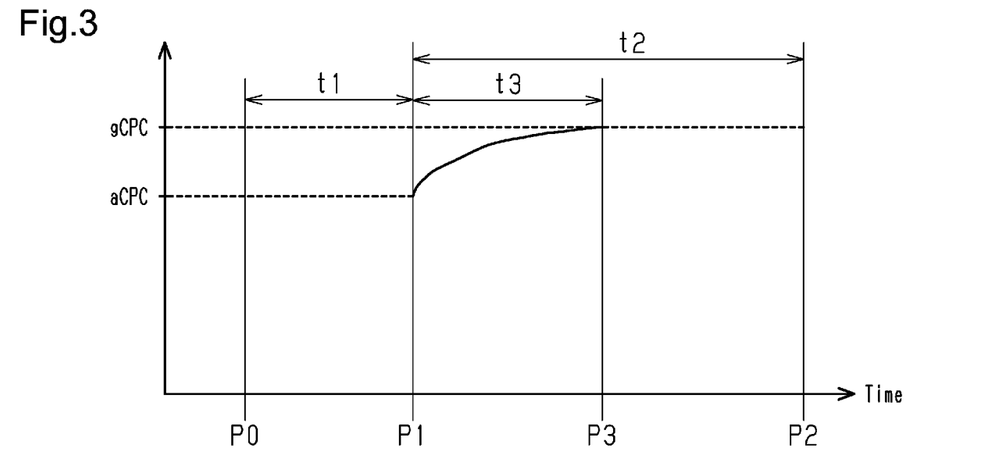
FIG. 3 is a graph illustrating the period factor.

First. the period factor will be described with reference to FIGS. 3 and 4. In the graph shown in FIG. 3, the vertical axis represents CPC and the horizontal axis represents time. In the following description, the start of the advertising time is referred to as the start time P0, the bidding time (a bidding time point) of bidding for an advertisement is referred to as the bidding time (a bidding time point) P1, and the end of the advertising period is referred to as the end time P2. The point in time when adjustment for the aCPC to reach the gCPC is ended is referred to as the adjustment end time P3.

The period from the start time P0 to the bidding time P1 is referred to as the first period t1. The period from the bidding time P1 to the end time P2 is referred to as the second period t2. The period from the bidding time P1 and the adjustment end time P3 is referred to as the third period t3. During the third period t3, adjustment is performed for the aCPC to reach the gCPC.

The relationship between the first period t1 and the second period t2 changes depending on when the bidding time P1 occurs in the advertising period. For example, when the bidding time P1 is closer to the start time P0 in the advertising period, the following inequality is satisfied: First period t1<second period t2. In contrast, when the bidding time P1 is closer to the end time P2 in the advertising period, the following inequality is satisfied: First period t1>second period t2. The adjustment end time P3 or the third period t3 may have any value requested by the advertiser.

The appropriate optimized factor calculation unit 103 calculates the period factor from the first period t1, the second period t2, and the third period t3. The appropriate optimized factor calculation unit 103 uses, for example, equation (1) to calculate the period factor. In equation (1), t1, t2, and t3 represent the length of the first period t1, the length of the second period t2, and the length of the third period t3, respectively.

$$\text{Period factor} = t1/\text{minimum}(t1, t2, t3) \quad (1)$$

Figure 4:
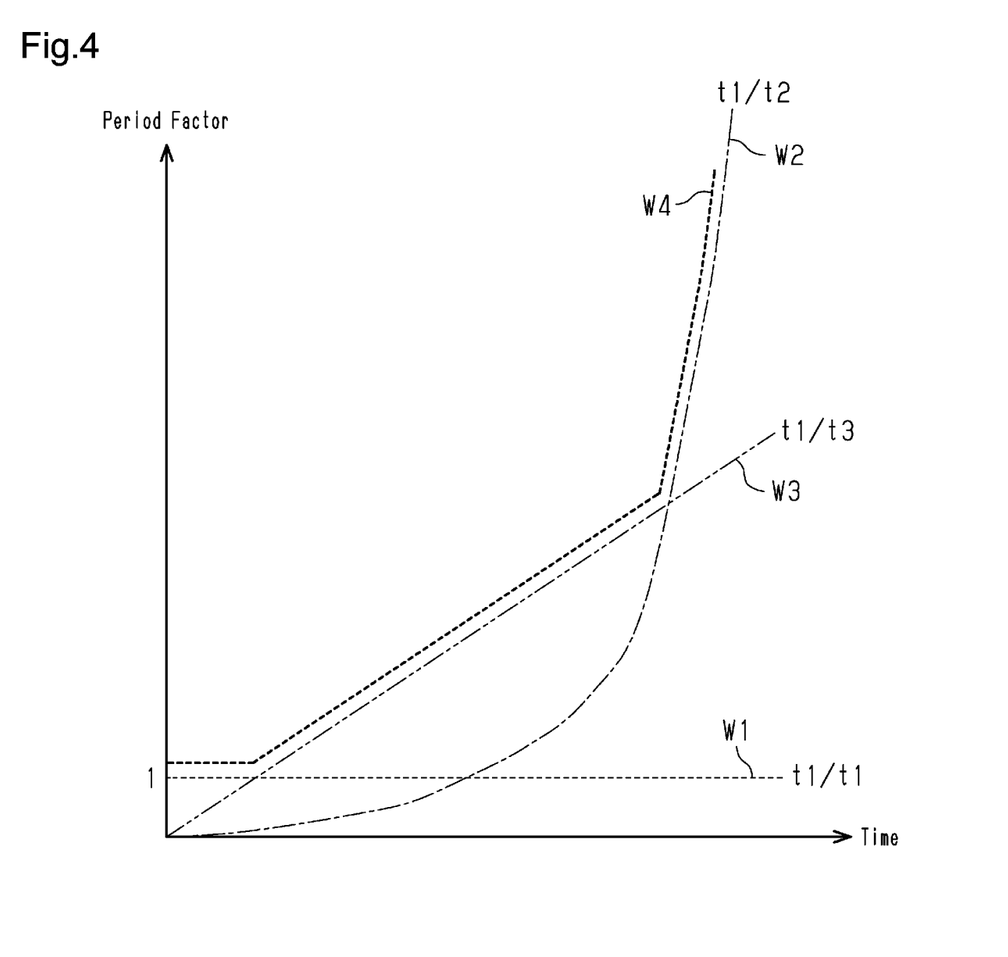
FIG. 4 is a graph illustrating the period factor.

FIG. 4 shows waveforms W1 to W4, each representing a different period factor. Waveform W1 represents a period factor in a case where the period factor is the ratio of the first period t1 to the first period t1. Waveform W2 represents a period factor in a case where the period factor is the ratio of the first period t1 to the second period t2. In this case, as waveform W2 indicates, the period factor increases non-linearly as time elapses. Waveform W3 represents a period factor in a case where the period factor is the ratio of the first period t1 to the third period t3. In this case, as waveform W3 indicates, the period factor increases linearly as the first period t1 in the advertising period becomes longer (that is, as the bidding time P1 becomes closer to the end time P2 in the advertising period). Further, as waveform W3 indicates, the period factor has a greater inclination as the third period t3 defined by the advertiser becomes shorter.

As indicated by equation (1), the appropriate optimized factor calculation unit 103 calculates, as the period factor, a value obtained by dividing the first period t1 by the shortest one of the first period t1, the second period t2, and the third period t3. In this case, the period factor has waveform W4. Thus, as waveform W4 indicates, the period factor remains constant while the first period t1 is the shortest period. The period factor increases linearly while the third period t3 is the shortest period. The period factor increases non-linearly while the second period t2 is the shortest period. That is, as time passes in the advertising period, the period factors in the first period t1 and the second period t2 have a greater value and change to a larger extent. As the third period t3 becomes shorter, the period factor has a larger value and changes to a larger extent.

The appropriate optimized factor calculation unit 103 calculates the appropriate optimized factor from the calculated period factor and the advertising cost ratio that has been calculated by the ratio calculation unit 102. The appropriate optimized factor calculation unit 103 uses, for example, equation (2) to calculate the appropriate optimized factor.

$$\text{Appropriate optimized factor} = 1 - (\text{advertising cost ratio} - 1) \times \text{period factor} \quad (2)$$

As indicated by equation (2), when the aCPC is greater than the gCPC, the advertising cost ratio is greater than 1 and the appropriate optimized factor becomes smaller as the difference between the aCPC and the gCPC increases. In contrast, when the aCPC is less than the gCPC, the advertising cost ratio is less than 1 and the appropriate optimized factor becomes larger as the difference between the aCPC and the gCPC increases.

The smaller the period factor, the smaller impact the advertising cost ratio has on the appropriate optimized factor. The larger the period factor, the larger impact the advertising cost ratio has on the appropriate optimized factor.

Using the upper limit value information 111, the appropriate optimized factor calculation unit 103 determines whether the calculated appropriate optimized factor is greater than the upper limit value. The upper limit value information 111 indicates the upper limit value of the appropriate optimized factor. When determining that the calculated appropriate optimized factor is greater than the upper limit value, the appropriate optimized factor calculation unit 103 sets the appropriate optimized factor to the upper limit value. Using the lower limit value information 112, the appropriate optimized factor calculation unit 103 determines whether the calculated appropriate optimized factor is less than the lower limit value. The lower limit value information 112 indicates the lower limit value of the appropriate optimized factor. When determining that the calculated appropriate optimized factor is less than the lower limit value, the appropriate optimized factor calculation unit 103 sets the appropriate optimized factor to the lower limit value. The upper limit value and the lower limit value are, for example, specified by an advertiser. The upper limit value and the lower limit value will be described in detail later.

Detail of Determination Unit 104

The determination unit 104 will now be described in detail. At the bidding time P1, the determination unit 104 obtains information indicating the latest fCTR from the CTR forecaster 500. The determination unit 104 determines, as the bid price, a value adjusted by multiplying the appropriate optimized factor by a product of the gCPC and the fCTR. In this case, the upper limit value is, for example, a value at which the CPM obtained by multiplying the upper limit value by a product of the gCPC and the fCTR would generally be the highest bid price. Alternatively, when the advertising budget has a surplus immediately before the end time P2, the upper limit value is, for example, a value at which the bid price would be prevented from rising in order to use up the budget by the end time P2. In contrast, the lower limit value is, for example, a value at which the CPM obtained by multiplying the lower limit value by a product of the gCPC and the fCTR would generally be the lowest bid price. Alternatively, the lower limit value is, for example, the lowest successful bid price. This price would be set by media serving as an agent (e.g., media representative) that manages a medium on which an advertisement is exposed, and set by a publisher that manages advertising spaces of multiple mediums. In this manner, the upper limit value may be set with the media's perspective taken into account, and the lower limit value may be set with the publisher's perspective taken into account. The determination unit 104 outputs information indicating the determined bid price to the bid processing device 200. The bid processing device 200 places a bid using the bid price obtained from the bidding assistance device 10.

The bidding assistance device 10 may determine the upper limit value and the lower limit value from the bid prices of similar advertisements that were previously sold. In this case, the bidding assistance device 10 determines the upper limit value from a bid price that is higher than other ones of the bid prices of similar advertisements that were previously sold, and determines the lower limit value from a bid price that is lower than other ones of the bid prices of similar advertisements that were previously sold.

Operation of Bidding Assistance Device 10

The operation of the bidding assistance device 10 will now be described. As described above, when the advertising cost ratio has a value greater than 1 and the difference between the aCPC and the gCPC becomes larger, the appropriate optimized factor becomes smaller. When the aCPC is greater than the gCPC, the determination unit 104 multiplies the appropriate optimized factor having a small value by a product of the gCPC and the fCTR, thereby adjusting the bid price so as not to rise.

As described above, when the advertising cost ratio has a value less than 1 and the difference between the aCPC and the gCPC becomes larger, the appropriate optimized factor becomes larger. When the aCPC is less than the gCPC, the determination unit 104 multiplies the appropriate optimized factor having a large value by a product of the gCPC and the fCTR, thereby adjusting the bid price so as to rise.

As described above, the smaller the period factor, the smaller impact the advertising cost ratio has on the appropriate optimized factor, and the larger the period factor, the larger impact the advertising cost ratio has on the appropriate optimized factor. Thus, as the period factor becomes smaller, the determination unit 104 adjusts the bid price using the appropriate optimized factor to a smaller extent. As the period factor becomes larger, the determination unit 104 adjusts the bid price using the appropriate optimized factor to a larger extent.

Advantages of Bidding Assistance Device 10

(1) In the bidding assistance device 10 of the present embodiment, the ratio calculation unit 102 calculates the advertising cost ratio of the aCPC to the gCPC. The appropriate optimized factor calculation unit 103 calculates the appropriate optimized factor, which is used to adjust the bid price of an advertisement, from the advertising cost ratio and from the relationship between the advertising period and bidding time. The determination unit 104 uses the appropriate optimized factor, the gCPC, and the fCTR to determine the bid price at the bidding time P1.

In the bidding assistance device 10 of the present embodiment, even when the forecast accuracy of the fCTR by the CTR forecaster 500 is low, the bid price is adjusted using the appropriate optimized factor that is based on the appropriate optimized factor and the advertising cost ratio. As a result, the bid price is determined such that the advertising cost reaches a goal cost.

For example, when the aCPC is less than the gCPC, it is preferred that a successful bid be made to expose an advertisement on a webpage more frequently such that the aCPC becomes closer to the gCPC. To make a successful bid so that an advertisement is exposed on a webpage, a higher bid price needs to be presented as compared with the bid prices of other advertisers. When the aCPC is less than the gCPC, the appropriate optimized factor calculation unit 103 adjusts the bid price so as to become higher. Thus, the determination unit 104 allows for more successful bids. The more successful bids the advertiser makes, the more frequently the advertisement is exposed (that is, the more impressions the advertisement receives). As the advertisement receives more impressions, consumers may become more interested in the advertisement (that is, the recognition by consumers may grow, click-through may increase, and CTR may increase). In contrast, when the number of impressions exceeds a certain degree, the CTR may fall due to an excessive increase in the number of deliveries (i.e., due to an excessive increase in the number of deliveries beyond an increase in the click-through). In such a case, a value different from the above-described upper limit value is used to reduce the bid price so as to prevent the advertisement from being exposed too frequently. Thus, increasing the CTR (i.e., aCPC) allows the aCPC to become closer to the gCPC.

When the aCPC is greater than the gCPC, the advertising effectiveness is sufficient in the advertising period. Thus, further exposure of an advertisement on a webpage is not preferred. To stop exposing an advertisement to a webpage, a lower bid price needs to be presented as compared with the bid prices of other advertisers. When the aCPC is greater than the gCPC, the appropriate optimized factor calculation unit 103 adjusts the bid price so as to become lower. Thus, the determination unit 104 prevents successful bids from being frequently made. The less successful bids the advertiser makes, the less frequently the advertisement is exposed (that is, the less impressions the advertisement receives). As the advertisement receives less impressions, consumers may become less interested in the advertisement (that is, the recognition by consumers may not easily grow, click-through may decrease, and CTR may decrease). In contrast, when the number of impressions exceeds a certain degree, the CTR may rise due to an excessive decrease in the number of deliveries (i.e., due to a decrease in the number of deliveries beyond a decrease in the click-through). In such a case, a value different from the above-described lower limit value is used to limit a drop in the bid price so as to prevent an excessive decrease in the advertisement exposure. Thus, decreasing the CTR (i.e., aCPC) allows the aCPC to become closer to the gCPC.

(2) In the bidding assistance device 10 of the present embodiment, the appropriate optimized factor calculation unit 103 calculates the period factor, which indicates the relationship between the advertising period and the bidding time. The appropriate optimized factor calculation unit 103 calculates, as the period factor, a value obtained by dividing the first period t1 by the shortest one of the first period t1, the second period t2, and the third period t3.

As described above, the bid price needs to be adjusted actively depending on when the bidding time P1 occurs in the advertising period or depending on the length of the third period t3. The appropriate optimized factor calculation unit 103 calculates the period factor using the shortest one of the first period t1, the second period t2, and the third period t3. This allows the determination unit 104 to adjust the bid price using the appropriate optimized factor that is based on the period factor corresponding to the bidding time P1 in the advertising period, and allows the determination unit 104 to determine the bid price such that the advertising cost reaches a goal cost.

(3) In the bidding assistance device 10 of the present embodiment, the appropriate optimized factor calculation unit 103 compares the calculated appropriate optimized factor with the upper limit value and the lower limit value. When the calculated appropriate optimized factor is greater than the upper limit value, the appropriate optimized factor calculation unit 103 sets the appropriate optimized factor to the upper limit value. When determining that the calculated appropriate optimized factor is less than the lower limit value, the appropriate optimized factor calculation unit 103 sets the appropriate optimized factor to the lower limit value.

Setting the appropriate optimized factor to the upper limit value prevents the determination unit 104 from determining an unnecessarily high bid price. Unless otherwise provided, exposing an advertisement at a lower cost is preferred for media. Setting the appropriate optimized factor to the upper limit value avoids situations in which the bid price is increased in order to use up the advertising budget.

Setting the appropriate optimized factor to the lower limit value prevents the determination unit 104 from determining a low bid price that is not suitable for a successful bid. Further, setting the appropriate optimized factor to the lower limit value allows the publisher to hinder the advertisement from being exposed at a low cost. This maintains the revenue gained by a medium. For example, when there is no bid that satisfies the lower limit value, the publisher can, for example, expose another reservation advertisement instead of displaying a programmatic advertisement through RTB. As a result, the revenue is gained. Accordingly, the bidding assistance device 10 prevents the bid price from becoming excessively high or becoming excessively low.

The above-described embodiment may be modified as follows. The above-described embodiment and the following modifications can be combined as long as the combined modifications remain technically consistent with each other.

The performance monitor 300, the bid processing device 200, the advertising delivery performance DB 400, and the CTR forecaster 500 may be, for example, partially or wholly integrated with the bidding assistance device 10.

In the foregoing, the bidding assistance device 10 adjusts a bid price such that the aCPC becomes closer to the gCPC. The bidding assistance device 10 may adjust a bid price using, for example, cost per action (CPA) instead of (or in addition to) cost per click (CPC). In this case, the above-described click-through rate (CTR) is replaced with conversion rate (CVR), and CPC is replaced with CPA. In this case, "conversion" means that, for example, a website visitor becomes a customer, makes an inquiry, applies for free trial, registers an email newsletter, downloads a whitepaper, applies for a seminar, requests a document, registers membership, downloads an application, and follows or adds a friend in a social networking service (SNS). The obtaining unit 101 obtains, as the gCPC, information indicating the CPA of an advertisement requested by the advertiser in the advertising period. The performance monitor 300 obtains, as the aCPC, an index indicating the CPA of the advertisement that has been exposed on a webpage in the advertising period. The ratio calculation unit 102 calculates, as the advertising cost ratio, a value obtained by dividing, by the CPA of the advertisement requested by the advertiser in the advertising period, the CPA of the advertisement that has been exposed on a webpage in the advertising period.

This configuration allows the bidding assistance device 10 to adjust the bid price such that the CPA becomes closer to a goal CPA.

When the advertiser does not request the adjustment end time P3 or the third period t3, the appropriate optimized factor calculation unit 103 may calculate, as the period factor, a value obtained by dividing the first period t1 by the shorter one of the first period t1 and the second period t2. In such a configuration, even when the advertiser does not request the adjustment end time P3 or the third period t3, the appropriate optimized factor calculation unit 103 properly adjusts the bid price.

The appropriate optimized factor calculation unit 103 does not have to use equation (1) to calculate the period factor. For example, when the difference between the aCPC and the gCPC is large or when the aCPC and the gCPC are adjustable in a short period of time in the advertising period, the appropriate optimized factor calculation unit 103 may calculate the period factor having a large value. Alternatively, when the difference between the aCPC and the gCPC is small or when the aCPC and the gCPC are adjustable in a long period of time in the advertising period, the appropriate optimized factor calculation unit 103 may calculate the period factor having a small value.

The appropriate optimized factor calculation unit 103 does not have to use equation (2) to calculate the appropriate optimized factor. For example, when the difference between the aCPC and the gCPC is large or when the aCPC and the gCPC are adjustable in a short period of time in the advertising period, the appropriate optimized factor calculation unit 103 may calculate the appropriate optimized factor having a large value. Alternatively, when the difference between the aCPC and the gCPC is small or when the aCPC and the gCPC are adjustable in a long period of time in the advertising period, the appropriate optimized factor calculation unit 103 may calculate the appropriate optimized factor having a small value.

As an alternative, regardless of the lengths of the third period t3, first period t1, and second period t2, the appropriate optimized factor calculation unit 103 may calculate, as the period factor, a value obtained by dividing the first period t1 by the third period t3. These configurations allow the appropriate optimized factor calculation unit 103 to adjust the bid price at an adjustment degree desired by the advertiser.

The appropriate optimized factor calculation unit 103 may use at least one of the upper limit value and the lower limit value as a threshold value of the appropriate optimized factor. In such a configuration, when not using the upper limit value, the appropriate optimized factor calculation unit 103 allows for more successful bids at sufficiently high bid prices. Further, when not using the lower limit value, the appropriate optimized factor calculation unit 103 allows for successful bids at low bid prices.

The various values related to the delivery performance include a click-through rate (CTR), cost per click (CPC), conversion rate (CVR), cost per action (CPA), click through (CT), conversion (CV), impression (IMP), and cost spent for advertising delivery. Similar advertisements include, for example, advertisements having similar advertising content, advertisements having similar temporal tendencies of the advertising period, and advertisements in which audiences subject to the exposure of the advertisements have similar attributes.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A real-time bidding system, comprising:
   at least one memory configured to store computer program code; and
   at least one processor configured to operate as instructed by the computer program code, the computer program code including:

ratio calculation code configured to cause at least one of the at least one processor to calculate, at a bidding time in an advertising period, a cost ratio of an actual advertising cost index to a goal advertising cost index, the actual advertising cost index being based on an advertising delivery performance at the bidding time, the goal advertising cost index being requested by an advertiser in the advertising period, adjustment factor calculation code configured to cause at least one of the at least one processor to calculate, at the bidding time, an adjustment factor based on the cost ratio and on a relationship between the advertising period and the bidding time, the adjustment factor being used to adjust a bid price of an advertisement, the relationship between the advertising period and the bidding time including a period ratio of a first period to a shortest of the first period, a second period, and a third period, the first period being from a start of the advertising period to the bidding time, the second period being from the bidding time to an end of the advertising period, and the third period being a period which is requested by the advertiser and by which adjustment for the actual advertising cost index to reach the goal advertising cost index ends, determination code configured to cause at least one of the at least one processor to determine, at the bidding time, the bid price based on the calculated adjustment factor, the goal advertising cost index, and a forecast effectiveness index that has been forecast from advertising effectiveness, the advertising effectiveness being obtained from the advertising delivery performance, and bidding code configured to cause at least one of the at least one processor to place a bid for the advertisement in real time, at the bidding time, through a bid processing device communicably connected to the real-time bidding system, based on the determined bid price.

2. The real-time bidding system according to claim 1, wherein the at least one processor is configured to set the adjustment factor to an upper limit value of the adjustment factor when the calculated adjustment factor is greater than the upper limit value or set the adjustment factor to a lower limit value of the adjustment factor when the calculated adjustment factor is less than the lower limit value.

3. The real-time bidding system according to claim 1, wherein the forecast effectiveness index has been forecast from a tendency of delivery performance of another advertisement that is similar to the advertisement.

4. A real-time bidding method, comprising, at a bidding time in an advertising period:

calculating, by at least one processor, a cost ratio of an actual advertising cost index to a goal advertising cost index, the actual advertising cost index being based on an advertising delivery performance at the bidding time, the goal advertising cost index being requested by an advertiser in the advertising period;

calculating, by the at least one processor, an adjustment factor based on the cost ratio and on a relationship between the advertising period and the bidding time, the adjustment factor being used to adjust a bid price of an advertisement, the relationship between the advertising period and the bidding time including a period ratio of a first period to a shortest of the first period, a second period, and a third period, the first period being from a start of the advertising period to the bidding time, the second period being from the bidding time to an end of the advertising period, and the third period being a period which is requested by the advertiser and by which adjustment for the actual advertising cost index to reach the goal advertising cost index ends;

determining, by the at least one processor, the bid price at the bidding time based on the calculated adjustment factor, the goal advertising cost index, and a forecast effectiveness index that has been forecast from advertising effectiveness, the advertising effectiveness being obtained from the advertising delivery performance; and placing a bid for the advertisement in real time, through a bid processing device communicably connected to the real-time bidding system, based on the determined bid price.

5. A non-transitory computer-readable medium that stores a program for causing at least one processor, at a bidding time in an advertising period, to:

calculate a cost ratio of an actual advertising cost index to a goal advertising cost index, the actual advertising cost index being based on an advertising delivery performance at the bidding time, the goal advertising cost index being requested by an advertiser in the advertising period;

calculate an adjustment factor based on the cost ratio and on a relationship between the advertising period and the bidding time, the adjustment factor being used to adjust a bid price of an advertisement, the relationship between the advertising period and the bidding time including a period ratio of a first period to a shortest of the first period, a second period, and a third period, the first period being from a start of the advertising period to the bidding time, the second period being from the bidding time to an end of the advertising period, and the third period being a period which is requested by the advertiser and by which adjustment for the actual advertising cost index to reach the goal advertising cost index ends;

determine the bid price at the bidding time based on the calculated adjustment factor, the goal advertising cost index, and a forecast effectiveness index that has been forecast from advertising effectiveness, the advertising effectiveness being obtained from the advertising delivery performance; and place a bid for the advertisement in real time, through a bid processing device communicably connected to the real-time bidding system, based on the determined bid price.

* * * * *